United States Patent Office 3,405,060
Patented Oct. 8, 1968

3,405,060
SEQUESTRATION OF METAL IONS
Richard P. Carter, Jr., Chesterfield, and Riyad R. Irani, St. Louis, Mo., assignors to Monsanto Company, St. Louis, Mo., a corporation of Delaware
No Drawing. Filed June 16, 1966, Ser. No. 557,926
10 Claims. (Cl. 210—58)

ABSTRACT OF THE DISCLOSURE

Poly (itaconic acid) or one of its water soluble salts is added to aqueous solutions containing metal cations for the purpose of inhibiting precipitation (sequestering) of the metal cations. The sequestering agent is effective over a wide range of pH conditions. Metals mentioned include cations of calcium, sodium and iron.

---

This invention relates to methods for sequestering or inhibiting the precipitation of metal ions from aqueous solutions and, more particularly, to the use of poly(itaconic acid) or a water soluble salt thereof as a sequestering agent for this purpose.

It is well understood that generally the ability of a sequestering agent to sequester or inhibit the precipitation of metal ions effectively is dependent upon the particular metal ion and the pH conditions. For example, a sequestering agent which is usually considered quite effective in sequestering a particular metal ion in an alkaline solution is usually found to be markedly less effective toward the same or another metal ion in an acid solution. In addition, it has usually been found that many sequestering agents are really only truly effective toward a particular metal ion within a narrow pH range. An outstanding example of this is the ability of the sequestering agent, sodium gluconate, to effectively sequester $FE^{+++}$ ions only at a pH of about 12 or above. As can be appreciated, therefore, a sequestering agent which is effective toward many and various metal ions over a wide range of pH values would be an advancement in this art.

Therefore, an object of this invention is to provide a method for sequestering or inhibiting the precipitation of metal ions from aqueous solutions.

Another object of this invention is to provide a sequestering agent which is effective in sequestering or inhibiting the precipitation of alkaline earth metal or heavy metal ions in acid or alkaline aqueous solutions.

A still further object of this invention is to provide a sequestering agent which is effective in sequestering or inhibiting the precipitation of $Ca^{++}$ or $Fe^{++}$ ions over a wide range of pH values.

Other objects will become apparent from a reading of the following detailed description.

It has been found that water soluble poly(itaconic acid) or its water soluble salts, said acid believed to have the following formula:

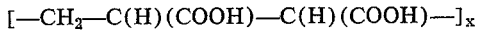

are effective sequestering agents for metal ions in aqueous solutions as will be more fully discussed hereinafter.

The poly(itaconic acid) and its water soluble salts as well as processes for preparing such are disclosed and described in U.S. Patent 3,055,873, issued Sept. 25, 1962, which is incorporated herein by reference.

It is to be understood that although the water soluble free acid resins can be used, the sodium salts of poly(itaconic acid) are preferred. However, other alkali metal salts, such as potassium, lithium and the like, as well as mixtures of the alkali metal salts may be used. In addition, any water-soluble salt (mono-valent cation), such as the ammonium salt, which exhibit the characteristics of the alkali metal salt may be also used to practice the invention.

The sequestering agents of the present invention exhibit, in addition to their sequestering ability, such advantageous properties as being hydrolytically stable, that is, having a substantial resistance to hydrolysis or degradation under various pH and temperature conditions, relatively inert or noncorrosive to metals, such as zinc, copper, aluminum and the like, and stable toward bleaching agents such as oxygen and/or chlorine bleaches as well as not materially interfering with the functioning of such agents.

Although the novel sequestering agents of the present invention are of general utility whenever it is desired to sequester or inhibit the precipitation of metal ions from aqueous solutions, they are especially effective in such applications as presented in the following table.

TABLE 1

| Use | Reason for use | Problem metal ions |
|---|---|---|
| Liquid soaps and shampoos. | Clarity | $Fe^{+++}$ |
| Bar soaps | Color | $Fe^{+++}$, $Ca^{++}$ |
| Bottle washing | Prevent film on bottles. | $Fe^{+++}$, $Ca^{+++}$, $Mg^{++}$ |
| Scouring wool cloth | Dye leveling | $Fe^{+++}$ |
| Cotton kier boiling | do | $Fe^{+++}$ |
| Cotton dyeing | do | $Fe^{+++}$ |
| Cotton bleaching (peroxide or chlorine). | Bleach stabilization | $Cu^{++}$, $Fe^{+++}$, $Mn^{++}$ |
| Metal cleaning compounds. | Removal of rust prevents ppt. | $Fe^{++}$ and $Fe^{+++}$ |
| Rubber and plastics (compounding and polymerization). | Trace metal contamination. | $Cu^{++}$, $Fe^{++}$ and $Fe^{+++}$ |
| Pulp and paper | do | $Fe^{++}$ and $Fe^{+++}$ |
| Boiler water treatment | Scale buildup | $Ca^{++}$, $Mg^{++}$, $Fe^{+++}$ |

The amount of the sequestering agent necessary to be effective varies with, inter alia, the type and amount of problem metal ions, pH conditions, temperature and the like, but in any event only minor amounts are usually sufficient. For example, for the uses listed above in Table 1 concentrations of less than about 1% by weight of water are usually sufficient and usually concentrations of from about 0.001% to about 0.5% are all that are required.

In order to illustrate the sequestering ability of poly (itaconic acid) and its salts, the following tests and comparisons were made with the indicated results.

In one series of tests, 100 mg. of poly(itaconic acid) was dissolved in 100 ml. of water, the pH was adjusted to the indicated value and maintained with caustic, and the following amount of ferris nitrate was added until a precipitate persisted (expressed as pounds of iron sequestering per 100 pounds of sequestering agent).

TABLE 2

| pH: | Pounds of $Fe^{+++}$ sequestered by 100 pounds of sequestering agent |
|---|---|
| 7 | 10.1 |
| 9 | 6.9 |
| 10 | 13.8 |
| 11 | 16.1 |

The sequestering agents of the present invention are quite effective in sequestering alkaline earth metal ions, such as, $Ca^{++}$, $Mg^{++}$, $Ba^{++}$, $Sr^{++}$ and the like. As being illustrative, a test was conducted by placing 1 gram of the sequestering agent in 50 ml. of distilled water and the pH adjusted to 8. Then 10 ml., 2% by weight solution, of $Na_2CO_3$ was added, the final pH adjusted to 11 with NaOH, and the volume made up to 100 ml. with distilled water. This solution is titrated to a cloudy end point ($CaCO_3$ precipitate) by a calcium acetate solution of 0.25 molarity. The following table reports the results of tests comparing poly(itaconic acid), itaconic acid, and sodium tripolyphosphate for calcium sequestration:

TABLE 3

| Additive: | Milligrams of calcium sequestered by 1 gram of additive |
|---|---|
| Poly(itaconic acid) | 460 |
| Sodium tripolyphosphate | 235 |
| Itaconic acid | 25 |
| None (control) | 10 |

As can be observed from the above table, poly(itaconic acid), on an equal weight basis, is over 10 fold more effective than itaconic acid and almost twice as effective as sodium tripolyphosphate, a widely used $Ca^{++}$ sequestering agent, in sequestering $Ca^{++}$ ions by the foregoing test and such indicates the extremely effective sequestering properties of the sequestering agents of the present invention.

The sequestering agents of the instant invention are quite effective in sequestering other heavy metal ions, especially the di- and tri-valent transitional metal ions, in aqueous solutions. As being illustrative, tests were conducted in which 10 mg. of the poly(itaconic acid) was dissolved in 100 ml. of water in each test. The pH was adjusted to the indicated value and maintained with caustic. The following amount of a chloride or acetate salt containing the indicated cation was added in each instance until a precipitate persisted (expressed as pounds sequestered per 100 pounds of sequestering agent).

TABLE 4

| Metal | Pounds sequestered by 100 pounds of sequestering agent | | | |
|---|---|---|---|---|
| | pH 5 | pH 7 | pH 9 | pH 11 |
| $Al^{+++}$ | 10 | 10 | 65 | Soluble |
| $Zn^{++}$ | Soluble | 79 | 109 | 146 |
| $Pb^{++}$ | 79 | 120 | 162 | 290 |
| $Cu^{++}$ | Soluble | 49 | 69 | 135 |

It should be noted that other heavy metal ions capable of being sequestered by the sequestering agents of the present invention include: $Fe^{++}$, $Co^{++}$, $Ni^{++}$, $Mn^{++}$, $Cd^{++}$, $Cr^{++}$, $Sn^{++}$ and the like.

From the foregoing, it can be appreciated that the sequestering agents of the present invention are effective toward many and various metal ions over a wide range of pH conditions which renders their use highly desirable in many and varied applications.

What is claimed is:
1. A method of inhibiting precipitation of metal cations from an aqueous solution containing said cations which comprises incorporating therein a sequestering agent selected from the group consisting of poly(itaconic acid) and its water soluble salts.
2. A method according to claim 1, wherein said metal cations are alkaline earth metal cations.
3. A method according to claim 2, wherein said alkaline earth metal cations are calcium cations.
4. A method according to claim 3, which comprises incorporating therein calcium sequestering quantities of poly(itaconic acid).
5. A method according to claim 3, which comprises incorporating therein calcium sequestering quantities of an alkali metal salt of poly(itaconic acid).
6. A method according to claim 5, wherein said alkali metal salt is a sodium salt.
7. A method according to claim 1, wherein said metal cations are transitional metal cations selected from the group consisting of divalent and trivalent metal cations.
8. A method according to claim 7, wherein said metal cation is iron.
9. A method according to claim 8, which comprises incorporating therein iron sequestering quantities of poly(itaconic acid).
10. A method according to claim 8, which comprises incorporating therein iron sequestering quantities of a sodium salt of poly(itaconic acid).

References Cited

UNITED STATES PATENTS

| 2,311,008 | 2/1943 | Tucker | 210—58 |
| 3,110,666 | 11/1963 | Hedley | 210—58 |
| 3,331,773 | 7/1967 | Gunderson et al. | 210—58 |

REUBEN FRIEDMAN, *Primary Examiner.*

J. ADEE, *Assistant Examiner.*